United States Patent [19]

Bruce

[11] Patent Number: 4,642,626

[45] Date of Patent: Feb. 10, 1987

[54] GRAPHIC DISPLAY SCAN LINE BLANKING CAPABILITY

[75] Inventor: Kenneth E. Bruce, Nashua, N.H.

[73] Assignee: Honeywell Information Systems Inc., Waltham, Mass.

[21] Appl. No.: 650,940

[22] Filed: Sep. 17, 1984

[51] Int. Cl.4 .................................................. C09G 1/16

[52] U.S. Cl. .................................... 340/750; 340/723; 340/747; 340/748; 340/799

[58] Field of Search ............... 340/721, 730, 709, 735, 340/790, 750, 723, 747, 798, 799

[56] References Cited

U.S. PATENT DOCUMENTS

| | | | |
|---|---|---|---|
| 4,470,042 | 9/1964 | Barnich et al. | 340/721 |
| 4,498,081 | 2/1985 | Fukushima et al. | 340/721 |
| 4,520,356 | 5/1985 | O'Keefe et al. | 340/750 |
| 4,542,376 | 9/1985 | Buss et al. | 340/721 |

*Primary Examiner*—Gerald L. Brigance

*Attorney, Agent, or Firm*—Nicholas Prasinos; John S. Solakian

[57] ABSTRACT

The invention pertains to a computer display system for displaying text and graphics on a scan line basis wherein a scan line windowing apparatus for selectively blanking the graphics display is provided.

A bit map memory, in addition to storing information to be displayed on a CRT, further stores a bit for each scan line which is utilized to control the enabling or disabling of a portion of the information in the bit map memory which is to be displayed on the CRT.

4 Claims, 4 Drawing Figures

BIT MAP MEMORY

GRAPHIC DISPLAY SCAN LINE BLANKING CAPABILITY

BACKGROUND OF THE INVENTION

1. Field of the Invention

This invention relates generally to a graphics display capability in a data processing system, and more particularly to a hardware apparatus and method for permitting the selective blanking of the graphics portion of the display on a scan line basis without affecting the graphics display memory.

2. Description of the Prior Art

The graphics option of a computer system permits the system to display point-addressable graphics. This option is aimed at the business graphics marketplace where the ability to easily generate and modify pie charts, line charts and so forth are the prime objective. In many of these systems graphics and alphanumeric text are displayed visually. This allows the relationship between many variables of the business to be presented in pie chart or bar graph form. Graphics can be further utilized to display and manipulate mechanical or other electronic type designs.

In a system where text and graphics must share the same viewing screen area, it is difficult to read the text when both are present. What is needed is a system which allows blanking of a portion of the graphics portion that is displayed in order to highlight the display of the alphanumeric character. The prior art solved this problem by concentrating on the control of the display address to provide such window capabilities. This required excessive hardware to control the counters and multiplexing, and subsequently the addressing of each pixel. Accordingly, additional costs in the form of hardware was added to the computer system, and more importantly, it increased the processing time thereby reducing the overall system throughput.

OBJECTS OF THE INVENTION

It is a primary object of the invention to have an improved combined graphics and alphanumeric display system.

It is a further object of the invention to have an improved graphics display system having window capabilities.

It is another object of the invention to provide an improved graphics system incorporating improved apparatus for selectively blanking of the graphics portion of the display having combined graphics and alphanumeric information.

Yet another object of the invention is to provide a combined alphanumeric graphics display system which permits the blanking of the graphics portion of the display selectively on a scan line basis without affecting the graphics display memory.

SUMMARY OF THE INVENTION

The instant invention provides for a display apparatus wherein alphanumeric data or graphics may be displayed on a fluorescent screen, similar to a TV monitor. As in a TV screen, an electron beam is caused to scan the face of the tube on a line-by-line basis. Each scan line of the displayed data contains 720 pixels (bits). These bits are read from a bit map memory and stored in a register and then shifted during the display enable signal, which is 720 bit times in duration. The bit map memory stores pixels in bit addressable locations. An image of the display is stored in the bit map memory since each location represents a point of the display. The bit map memory is comprised of 300 scan lines, each scan line having 720 pixels comprising the usable portion of the memory and an additional 304 pixels comprising the non-displayable portion of memory. (The non-displayable portion of memory is reserved for future use.) Each displayable location in the bit map represents a pixel to be displayed on the monitor. The addressing architecture is set up to address each scan line on a modular 1024 pixel count basis, one pixel per address; i.e., scan line 0 includes address pixels 0 through 1023, scan line 1 includes address pixels 1024 through 1247, etc. The instant invention utilizes the 721st pixel to control the next scan line. Accordingly, the 721st bit is loaded to control the display of the next scan line of the bit map. If the 721st bit is loaded to a ONE, the following scan line data will be blanked and no data will be displayed. The 721st bit of scan line 300 will control the first scan line following the vertical retrace. This allows windows in the graphics display to allow text to be "ORed" without overlaying the graphics data.

BRIEF DESCRIPTION OF THE DRAWINGS

The novel features which are characteristic of the invention are set forth with particularity in the appended claims. The invention itself, however, both as to organization and operation, may best be understood by reference to the following description in conjunction with the drawings in which:

DESCRIPTION OF A PREFERRED EMBODIMENT

Figure 1:
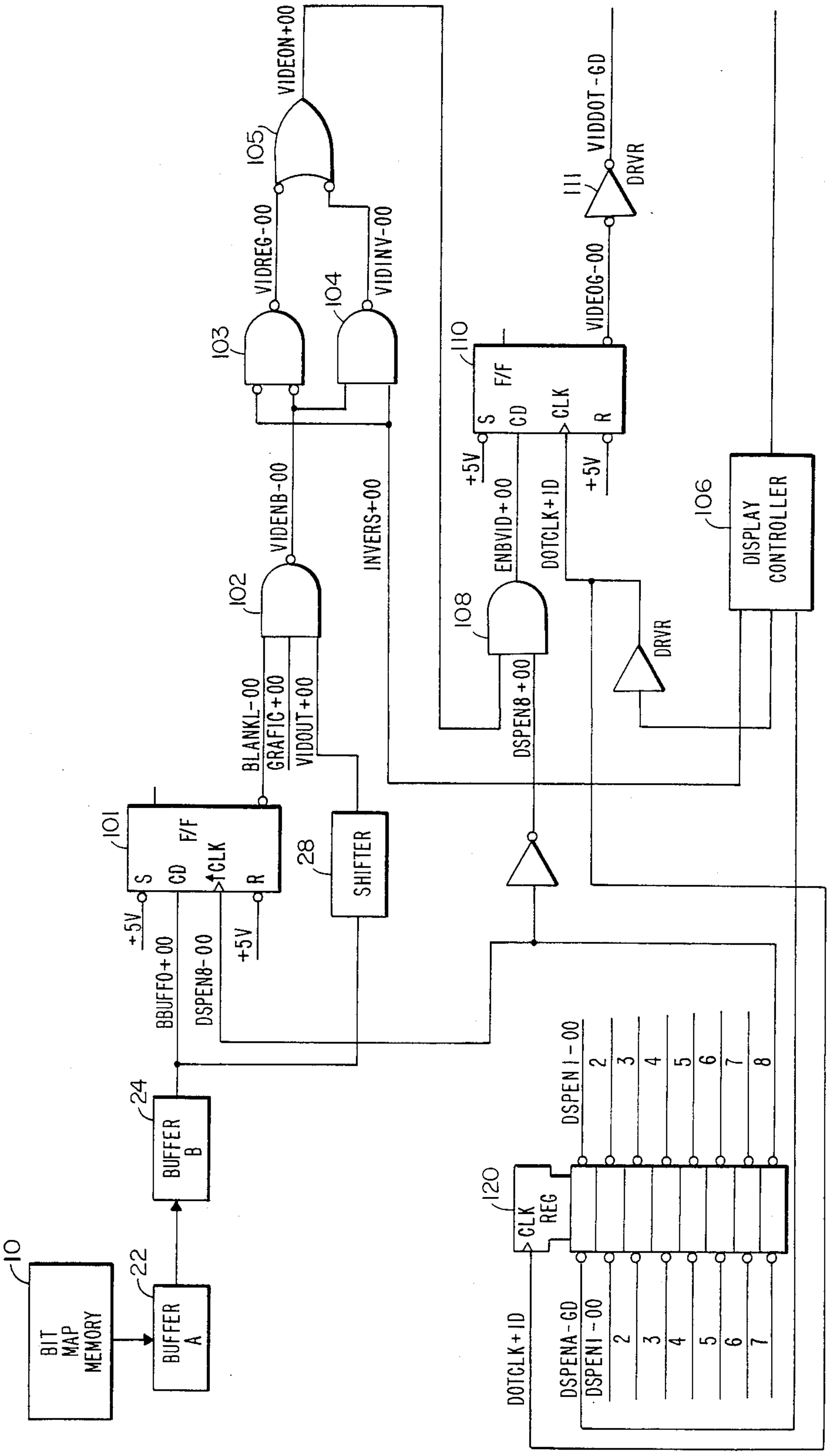
FIG. 1 is a logic block diagram of the invention.

Referring to FIG. 1 there is shown a logic block diagram of the invention. The invention provides for the blanking of the next horizontal data scan line. The blanking operation logic is associated with the normal and inverse modes of operation. Under the normal mode of operation the graphics is light and the background is dark; whereas in the inverse mode of operation the graphics is dark and the background is light. When operating in a blanking mode, portions of the graphics are blanked out. Accordingly, the video out signal must be modified to be suppressed when the 721st bit of the bit map memory is loaded to ONE.

In the normal operation, the signal video out VIDOUT+00 is applied to one leg of NAND gate 102 from shifter 28. Shifter 28 is a commercially available shift register. Assuming also that we are in a graphics mode, the GRAFIC+00 signal applied to another input of NAND gate 102 is high. Since also this is a normal operation rather than a blanking operation, signal BLANKL−00 is high also. Accordingly, the output of the video enable signal VIDENB−00 is an inverted form of the input signal VIDDOUT+00. Signal VIDENB−00 is applied to one input terminal of gate 103 and is also applied to one input terminal of NAND gate 104. Since this is not an inverse mode, signal IN- VERS+00 is low and is applied to another input terminal of NAND gate 104 and is also applied to a second input terminal of gate 103. Accordingly, when the signals of all the input terminals of NAND gate 102 are high, the output signal VIDENB−00 is low and will follow inversely the VIDOUT+00 signal as it goes high and low. As we have seen, the inverse signal INVERS+00 is low, since this is not the inverse mode, and accordingly as the VIDENB−00 signal varies up and down, the output signal on negative AND gate 103 VIDREG−00 will also vary up and down, following the VIDENB−00 signal. Accordingly, the VIDREG−00 output signal of gate 103 follows inversely the input signal VIDOUT+00 on NAND gate 102. Similarly the video inverse signal VIDINV−00 at the output terminal of NAND gate 104 will inversely follow the VIDOUT+00 signal on one input terminal of NAND gate 102. These signals applied to negative OR gate 105 cause the VIDEON+00 signal to fluctuate up and down. The VIDEON+00 signal is then applied to one input terminal of AND gate 108. In order for the VIDEON+00 signal to pass through AND gate 108, the display enable signal DSPEN8+00 must also be high. When both input signals to AND gate 108 are high, then the output signal ENBVID+00 follows the video on signal VIDEON+00. The ENBVID+00 signal is then applied to the CD terminal of flip-flop 110. A bit clock signal DOTCLK+1D is applied to the clock terminal CLK of flip-flop 110 and causes flip-flop 110 to set when the ENBVID+00 signal is high and resets when the ENBVID+00 signal is low. Therefore the flop also follows the VIDEON+00 signal clocked to the bit clock signal DOTCLK+1D. The output signal VIDEOG−00 on flip-flop 110 is sent through a driver 111 to the display controller 106 and that signal is high when the bits are to be displayed on the screen monitor and low when the bits are not to be displayed on the screen monitor.

In the inverse mode, on the other hand, there would be no dot on the monitor if in the normal mode there would be a dot. Therefore the signal which comes out from shifter 28 VIDOUT+00 has to be inverted when the invention is operated in the inverse mode. This is done by adding the inverse signal INVERS+00 applied to NAND gate 104 high so that the output of NAND gate 104 signal VIDINV−00 follows the VIDOUT+00 signal. Accordingly, the video on signal VIDEON+00, which is the output of negative OR gate 105 sees the negative or inverse of the VIDINV−00 signal and is applied to AND gate 108 causing flip-flop 110 to follow that signal.

In the blank mode the object is to disable the VIDOUT+00 signal from conveying any information on the screen during the next horizontal sweep of the beam across the face of the CRT tube. This is done by disabling the output of NAND gate 103 so that it stays high and does not follow the VIDOUT signal. This is done by utilizing the 721st bit which appears as the BBUFFO+00 signal. DSPEN8−00 is the display enable signal DSPENA−00 received from the display controller 106 delayed by 8 dot clock signals in register 120. This delay is needed to align graphics data with text data also displayed on the CRT. At the end of DSPEN8−00 time the next bit from the bit map memory 10 is transferred to Buffer B 24 via Buffer A 22. Signal BBUFFO+00 which represents pixel 721 of this scan line is then also applied to the CD terminal of flip-flop 101. Flip-flop 101 sets when the display enable signal DSPEN8−00 goes high. The BBUFFO+00 signal is also applied to shifter 28 which is then shifted and applied as the VIDOUT+00 to NAND gate 103. The DSPEN8−00 signal goes high at the end of each horizontal scan line.

When flip-flop 101 sets the blanking signal BLANKL−00 will go low forcing the output of NAND gate 102 to go high and stay high during the next horizontal scan line; thus providing a blank line in the normal mode and a solid line in the inverse mode.

Figure 2:
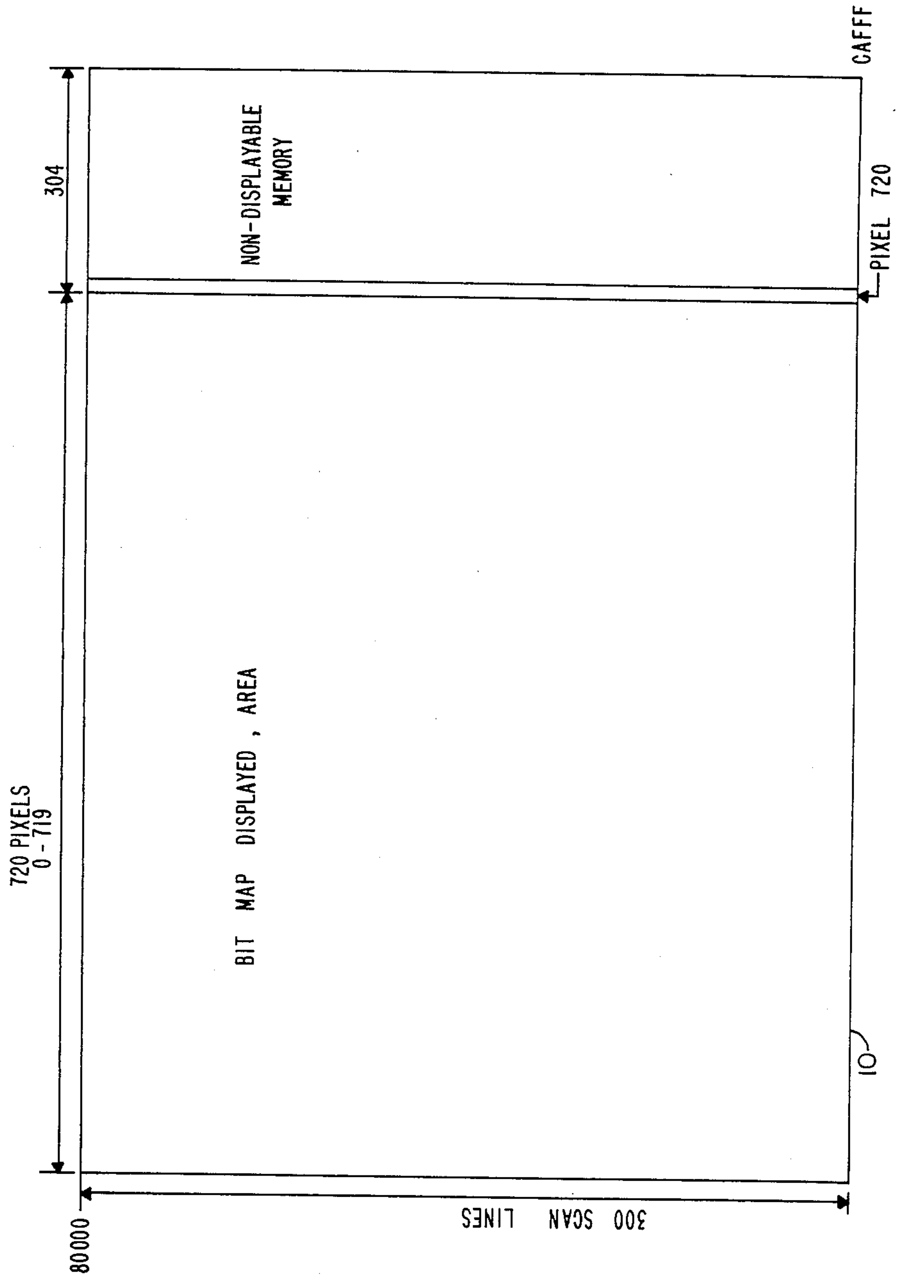
FIG. 2 is a schematic representation of the bit map memory utilized in the invention.

Referring now to FIG. 2, there is shown in diagrammatic form a bit map memory. The memory is divided into two areas, the displayed portion of the memory and the unusable memory. The memory is further comprised of 300 scan lines with each scan line comprising 720 pixels which can be displayed and 304 pixels that cannot be displayed. The 721st pixel of each scan line is utilized to control the display of the next scan line. If the 721st bit is loaded to a ONE, the following scan line data will be blanked and no data will be displayed. The 721st bit of scan line 300 will control the first scan line following the vertical retrace.

Figure 3:
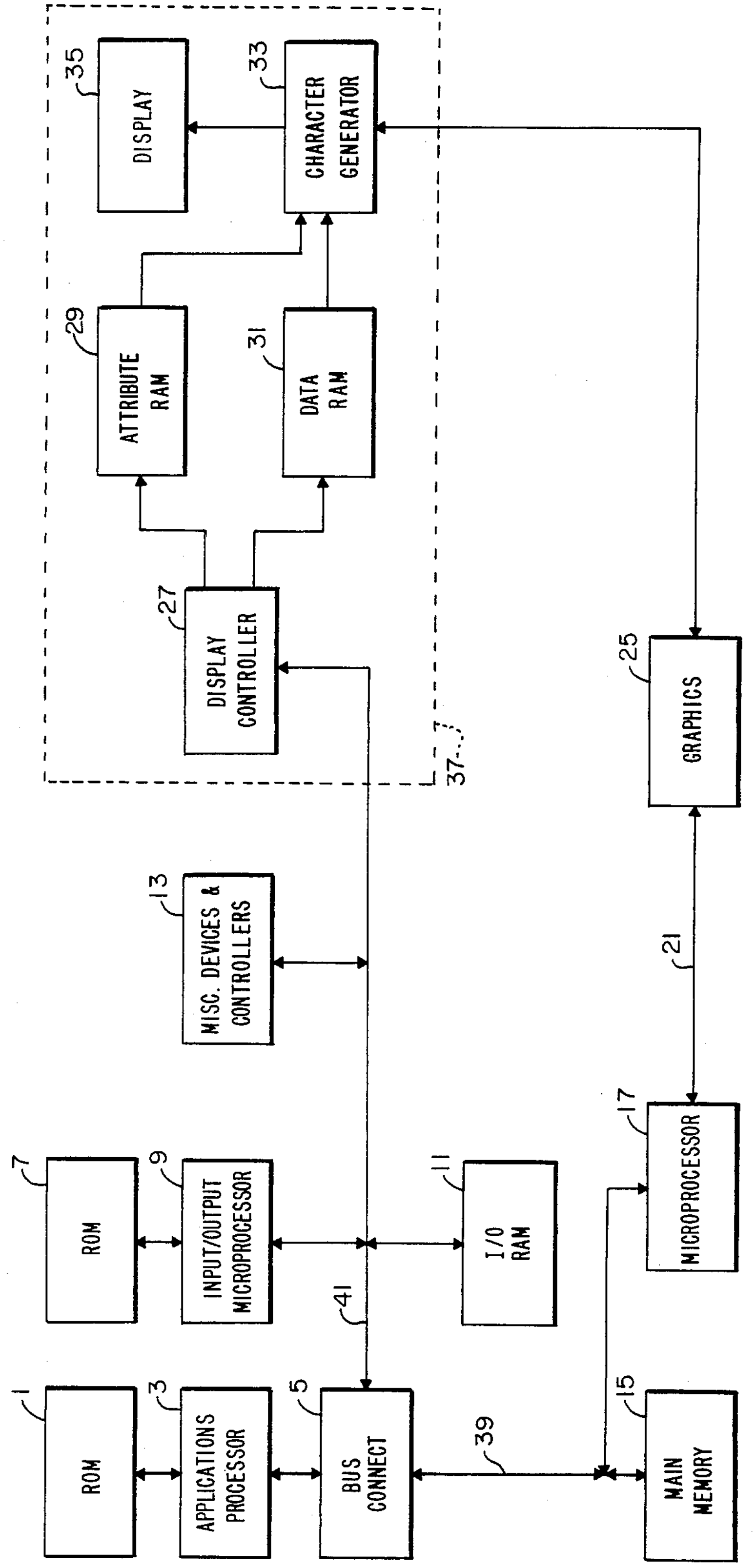
FIG. 3 is a block diagram of a typical data processing system which provides the environment for the invention.

Referring now to FIG. 3, there is shown a data processing system which includes a graphics capability in its display subsystem.

An applications processor 3 controlled by firmware stored in a read only memory (ROM) 1 executes applications programs. The applications processor 3 is coupled to a main memory 15 via bus connect 5 and a bus 39.

An input/output (I/O) microprocessor 9 controlled by firmware stored in a ROM 7 executes input/output instructions required for the execution of applications programs by the applications processor 3.

Typically main memory 15 stores the operating system, the applications programs and the information upon which the applications program operates. When access to a device is required, the applications processor 3 stores input/output instructions in an I/O random access memory (RAM) 11. I/O microprocessor 9 is responsive to the I/O instructions stored in I/O RAM 11 to control the transfer of information between main memory 15 and a peripheral device of miscellaneous devices and controller 13. Typical devices (not shown) are floppy disks, printers, keyboards, hard disks, and communication terminals.

A display subsystem 37 may be operative in conjunction with a keyboard to display information stored in main memory 15 and I/O RAM 11 on a display 35, typically a cathode ray tube display. Display subsystem 37 includes a display controller 27 which interfaces with I/O RAM 11 and main memory 15 under the control of I/O microprocessor 9 for the transfer of information for display. The information for display is stored in a data RAM 31. A character generator 33 receives the information from data RAM 31 and converts it to a series of dots which is timed to the raster scan of the display 35 to shape the alphabetic or numeric (text) characters. An attribute RAM 29 typically provides for the underlining, blanking, and inverting of selected characters.

The bus connect 5, I/O microprocessor 9, I/O RAM 11, miscellaneous devices and controller 13 and display controller 27 are all coupled in common to a bus 41 which includes an 8 bit data bus.

A microprocessor 17, typically an Intel 8086 microprocessor, is coupled to main memory 15 and bus connect 5 by a bus 39 which includes a 16 bit data bus.

Microprocessor 17 runs under MSDOS (operating system) which is stored in main memory 15. Microprocessor 17 is described in the 8086 Family Users Manual, October 1979 and published by Intel Corporation, 3065 Bowers Avenue, Santa Clara, Calif. 95051.

A graphics option 25 is coupled to microprocessor 17 by a bus 21 which includes an 8 bit data bus. Buses 21, 39 and 41 also include the necessary address and control signals.

The graphics option is aimed at the business graphics marketplace wherein the ability to generate and modify pie charts, line charts and the like in conjunction with the applications program being executed by applications processor 3 is a requirement. The graphics option 25 controls the display of point addressable graphics on display 35. This is accomplished by applications processor 3 calling on the graphics option 25 by sending command information to main memory 15. Microprocessor 17 is responsive to the command information to control graphics option 25 to send graphics information to the character generator 33.

Figure 4:
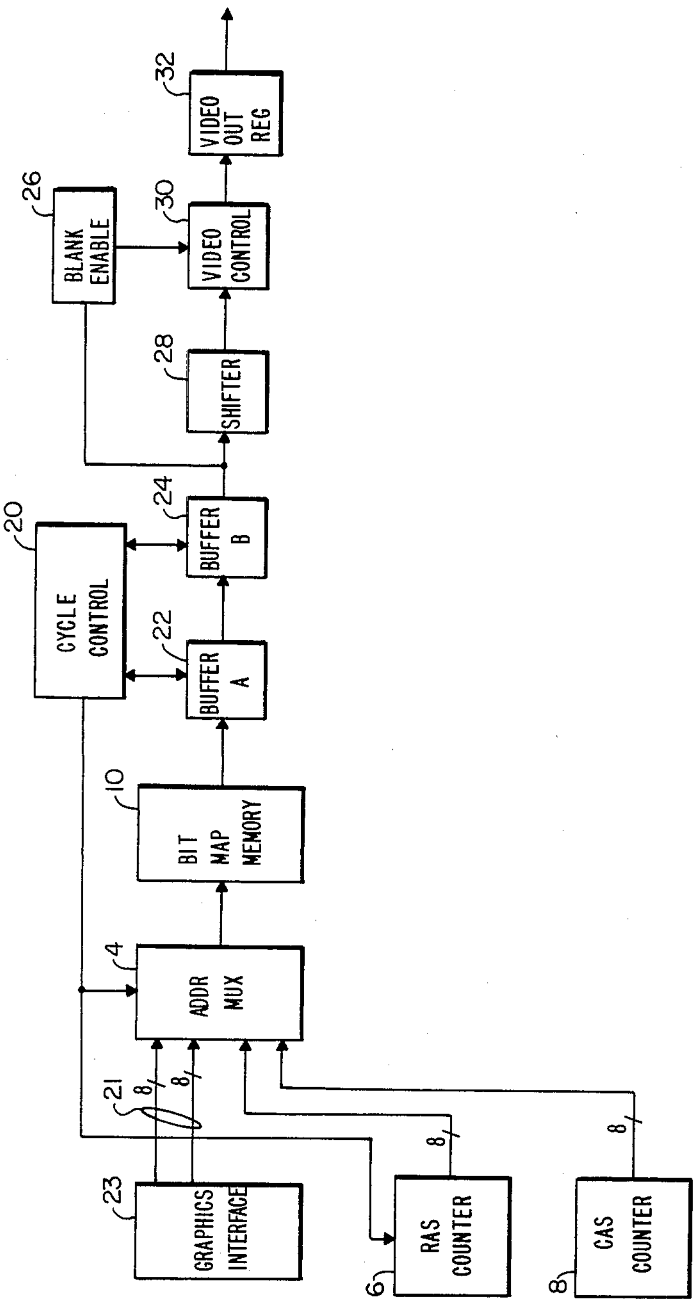
FIG. 4 is a block diagram of the graphic subsystem including the invention.

FIG. 4 shows a block diagram of the graphics option 25. A bit map memory 10 stores an image of the display screen of display 35. Bit map memory 10 stores 720 pixels (bit portions) for each of 300 scan lines for a total of 216,000 pixels. Bit map memory 10 is addressed via an address multiplexer 4 which selects 16 address signals, 8 at a time, from graphics interface 23, or 8 signals from a row address select (RAS) count 6 and 8 signals from a column address count select (CAS) count 8. Bit map memory 10 is made up of 8 64K×1 dynamic RAMs, storing 216,000 pixels for display on display 35. Also stored are a number of control bits.

The output signals of bit map memory 10 is double buffered in a buffer A 22 and a buffer B 22, serialized in a shifter 28 and the stream of bits applied to a video control 30. A video out register 32 output signal is applied to character generator 33, FIG. 1, for display on display 35.

A cycle control 20 controls the timing relationship between the addressing of bit map memory 10, by applying timing signals to RAS count 6, CAS count 8 and MUX 4, and the subsequent output signals stored in buffer A 22, and then transferred from buffer A 22 to buffer B 24.

What is claimed is:

1. In a computer display system having a text and graphics display capability for displaying text and graphics on a scan line basis, a scan line blanking apparatus for selectively blanking of the graphics display comprising:

(a) a bit map memory for storing electronic signals representative of information to be displayed on said display, and further storing enabling bits utilized in controlling said blanking apparatus;

(b) controller means responsive to said bit map memory for controlling the display of the information in said bit map memory, on said display; and, (c) blanking means responsive to enable bits stored in said bit map memory for either enabling the display of a portion of the information in said bit map memory, or blanking a portion of the information stored in bit map memory and preventing information from appearing on the display.

2. The computer display system as recited in claim 1 wherein a display bit is stored in said bit map memory for each scan line of display, said display bit being the next bit following the last displayable bit on the displayable portion of any scan line.

3. The computer display system as recited in claim 1 wherein 720 bits are stored for each scan line on the displayable portion of said bit map memory, and 304 bits are stored for each scan line in the non-displayable portion of said bit map memory, and said enable bit is the 721st bit of each scan line.

4. The computer display system as recited in claim 3 wherein the scan line data of a scan line following an enable bit at the end of any scan line, will be blanked when the enable bit is set to ONE.

* * * * *